Sept. 29, 1959  H. T. WHITE  2,906,208
MOTOR DRIVEN PUMPS
Filed July 14, 1955  2 Sheets-Sheet 2
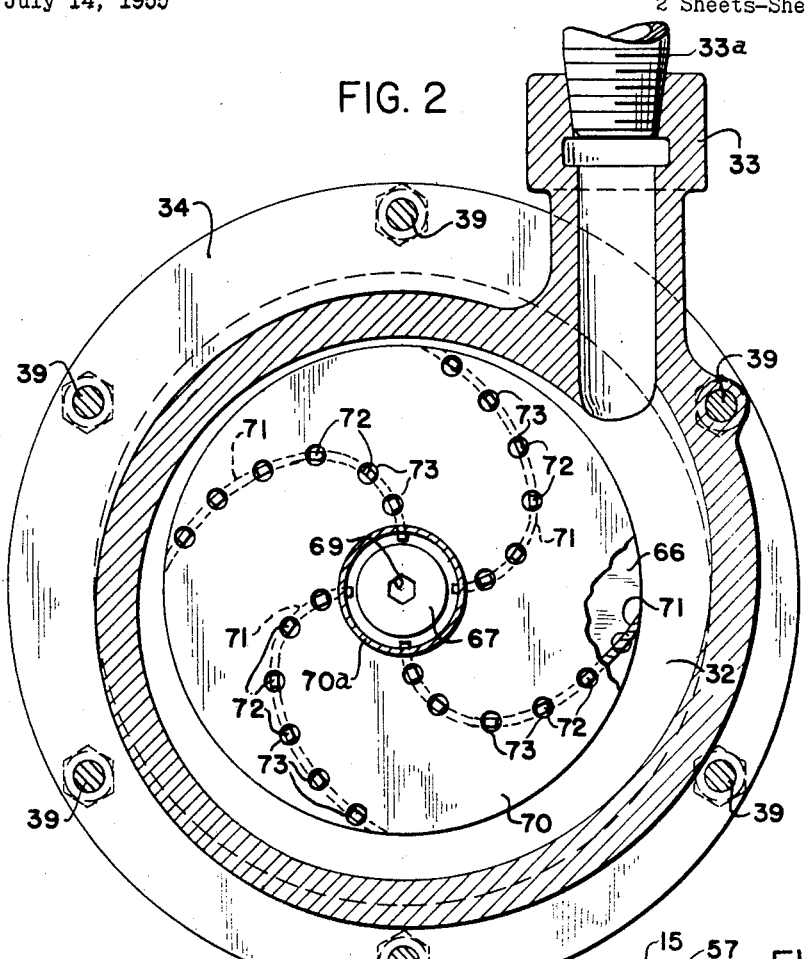
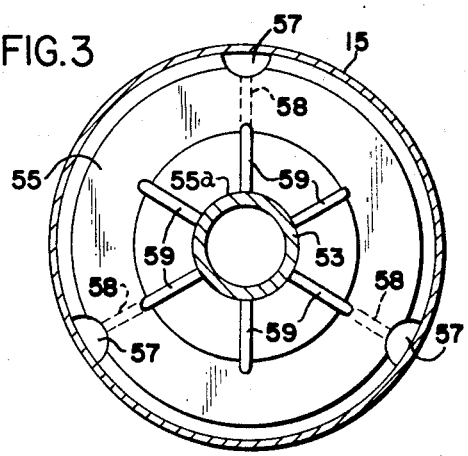
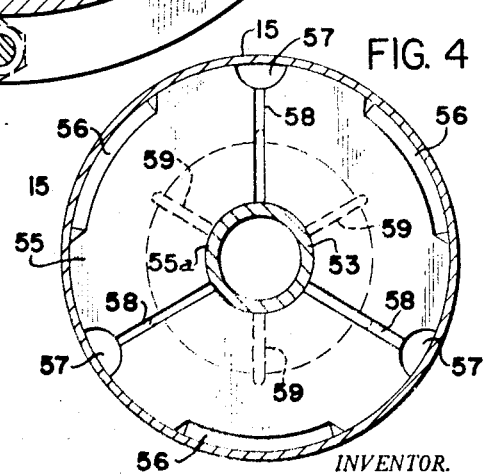
INVENTOR.
HOWARD T. WHITE
BY
ATTORNEY

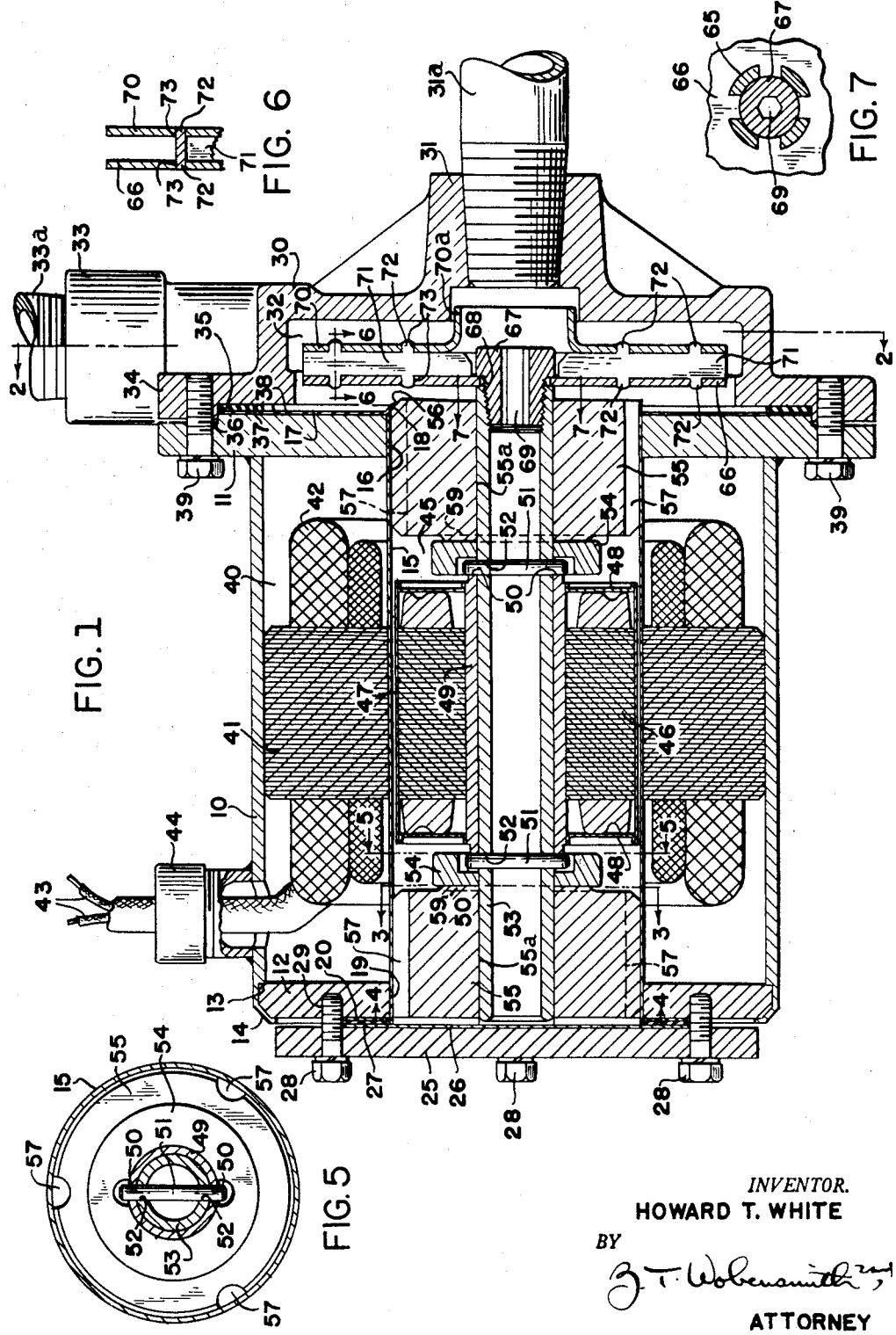

United States Patent Office 2,906,208
Patented Sept. 29, 1959

2,906,208

MOTOR DRIVEN PUMPS

Howard T. White, Melrose Park, Pa., assignor to Fostoria Corporation, Fostoria, Ohio, a corporation of Ohio Application July 14, 1955, Serial No. 522,073

9 Claims. (Cl. 103—87)

This invention relates to motor driven pumps.

It is the principal object of the present invention to provide a motor driven pump having an improved character of impeller and mounting therefor.

It is a further object of the present invention to provide a motor driven pump having an improved motor rotor mounting.

It is a further object of the present invention to provide a motor driven pump having an improved bearing construction.

It is a further object of the present invention to provide a motor driven pump in which the motor stator is sealed from the motor rotor and pump impeller and in which the component parts are arranged in an improved manner.

It is a further object of the present invention to provide a motor driven pump in which the parts exposed to the liquid being pumped are protected against corrosion.

It is a further object of the present invention to provide a motor driven pump in which parts exposed to the liquid being pumped are provided with protective coverings so that other material can be employed for the construction of the protected parts.

It is a further object of the invention to provide a motor driven pump in which the motor stator is isolated from the motor rotor and in which a portion of the fluid being pumped is circulated around the motor rotor for cooling and through the shaft bearings for lubrication.

Other objects and advantageous features will be apparent from the specification and claims.

The nature and characteristic features of the invention will be more readily understood from the following description, taken in connection with the accompanying drawings forming part thereof, in which:

Figure 1 is a longitudinal sectional view of a motor driven pump in accordance with the invention;

Fig. 2 is a transverse sectional view taken approximately on the line 2—2 of Fig. 1;

Fig. 3 is a transverse sectional view, enlarged, taken approximately on the line 3—3 of Fig. 1;

Fig. 4 is a transverse sectional view, enlarged, taken approximately on the line 4—4 of Fig. 1;

Fig. 5 is a transverse sectional view taken approximately on the line 5—5 of Fig. 1;

Fig. 6 is a fragmentary sectional view taken approximately on the line 6—6 of Fig. 1; and Fig. 7 is a fragmentary transverse sectional view taken approximately on the line 7—7 of Fig. 1.

It should, of course, be understood that the description and drawings are illustrative merely, and that various modifications and changes may be made in the structure disclosed without departing from the spirit of the invention.

Like numerals refer to like parts throughout the several views.

Referring now more particularly to the drawings, a motor housing is provided having an outer cylindrical casing portion 10 welded or otherwise secured at one end to an inner end plate 11 and having an inner end plate 12 at the other end, in spaced relation to the end plate 11. The end plate 12 can be seated in a recess in the interior of the casing portion bounded by a shoulder 13 and can be staked or otherwise formed over the end plate 12, as at 14, to hold the same in assembled relation.

A hollow cylindrical sleeve 15 is provided, preferably of stainless steel or other non-magnetic responsive metal, which is not subject to corrosion by the liquid to be pumped.

The sleeve 15 extends through an opening 16 in the end plate 11 and has welded or otherwise secured thereto a liner plate 17. The liner plate 17 can be of any desired material which is resistant to or not subject to corrosion by the liquid being pumped, such as stainless steel for some liquids, and thus permits of the end plate 11 being made of less expensive and more easily machined material than heretofore.

The sleeve 15 has tongues 18 extending therefrom for purposes to be explained.

The sleeve 15 also extends through an opening 19 in the end plate 12 and has welded or otherwise secured thereto a liner plate 20 which is similar to but of smaller diameter than the liner plate 17.

The inner end plate 12 has secured thereto an outer end closure plate 25 which closes the opening at the outer end of the sleeve 15. The outer end closure plate 25 has disposed on the inner face thereof a liner plate 26 of a material resistant to or not subject to corrosion by the liquid being pumped and permits of the end plate 25 being made of a less expensive and more easily machined material than heretofore.

A sealing gasket 27, of rubber, natural or synthetic, or other like compressible or resilient material, resistant to or not subject to corrosion by the liquid being pumped, is interposed between the facing surfaces of the liner plates 20 and 26. The end plate 25 is held in position with respect to the plate 12, and with the gasket 17 in compressed and fluid-tight condition, by studs 28 which engage in blind threaded holes 29 in the plate 12.

An impeller housing 30 is provided, having an axially disposed fluid inlet 31 to which a pipe 31a extends, an interior impeller chamber 32 of scroll shape, and a fluid delivery connection 33 from which a pipe 33a extends.

The impeller housing 30 can be made of any desired material resistant to corrosion by the liquid being pumped, and for this purpose can be made of stainless steel, titanium or the like. The impeller housing 30 has a flange 34 with an inner cylindrical face 35 adapted to engage with an outer cylindrical face 36 on the end plate 11. A sealing gasket 37, of rubber, natural or synthetic, or other like compressible or resilient material resistant to the liquid being pumped, is interposed between the liner plate 17 and an inner face 38 of the housing 30 and is compressed to fluid tight condition by studs 39 extending through the end plate 11 and in threaded engagement in the flange 34.

The space between the casing portion 10, the sleeve 15, the inner end plate 11 and the inner end plate 12 provides a sealed and isolated motor stator chamber 40 and may have disposed therein, and sealed from contact by the liquid being pumped, the motor field laminations 41 and motor field windings 42.

Conductors 43 for energizing the windings 42 can be provided, extending through a fluid tight seal 44, and connected to any suitable source of alternating current.

The space 45 within the interior of the sleeve 15 provides a motor rotor chamber.

A motor rotor 46 is provided and while it may be of any desired type is preferably of the short circuited type with an enclosure to prevent corrosion. For this purpose, an outer and enclosing cylindrical rotor cover 47 has rotor enclosing end plates 48 welded thereto, the inner margins of the plates 48 being secured to a cylindrical sleeve shaft 49 by welding or in any other desired manner to provide a fluid tight enclosure. The cover 47 and end plates 48 are preferably made of a material resistant to or not subject to corrosion by the liquid being pumped, stainless steel being suitable for some purposes.

The sleeve shaft 49 extends outwardly beyond the rotor end plates 48 axially on both ends and has aligned notches 50 for the reception of pins 51 which extend through suitable aligned openings 52 in a hollow shaft 53. Thrust washers 54 which extend over the pins 51 are mounted on the shaft 53 and their outer faces engage facing portions of bearings 55.

The bearings 55 are preferably of similar construction with central openings 55a for the reception and support for rotation of the shaft 53. The bearings 55 have a plurality of beveled notched portions 56 for engagement by the tongues 18 which prevent rotation and endwise displacement of the bearings 55. The bearings 55 also have grooves 57 along their outer peripheries, grooves 58 along their outer faces and grooves 59 along their inner faces to permit fluid flow.

The shaft 53 has an end portion extending into the impeller chamber 32 and provided with slots which leave dovetails 65 for engagement by complemental slots in a diametrically disposed impeller side plate 66. The impeller plate 66 is held in position by a lock nut 67 which is in threaded engagement in the end of the shaft 53, has a shoulder 68 engaging the impeller plate 66 and has a central opening 69 for fluid flow which is also shaped to receive a wrench (not shown) for tightening the nut 67 or loosen the same for removal.

The impeller plate 66 has disposed substantially parallel thereto another impeller plate 70, the inner cylindrical portion 70a of which extends toward the inlet 31 for directing the entering fluid between the plates 66 and 70.

The plates 66 and 70 have extending therebetween a plurality of curved vanes 71. The vanes 71 have tongues 72 which extend into and beyond openings 73 in the impeller plates 66 and 70 and have their outer ends spread or deformed to hold them in position.

The mode of operation will now be pointed out.

Upon energization of the windings 42, a rotating field is set up in the laminations 41 which is effective on the rotor 46 for rotating the shaft 53.

Fluid to be pumped is supplied through the pipe 31a to the fluid inlet 31, and enters the space within the impeller portions 70a and between the impeller plates 66 and 70, being guided by the exterior of the nut 67 and the interior of the impeller portion 70a.

The main body of the fluid being pumped is impelled by the vanes 71 and is directed by the interior scroll of the chamber 32 to the delivery connection 33.

A portion of the fluid enters through the ports 57 and opening 55a, at the right of Fig. 1, and the space around the thrust washer 54 into the chamber 45, then passes in the clearance space between the enclosure 47 and the sleeve 15 to the thrust washer 54 at the left, and the space therearound, the bearing opening 55a and the ports 57, to the left end of the shaft 53, and then through the interior of the shaft 53 and through the opening 69 to the inlet of the impeller.

The fluid passing the rotor end plates 48 and enclosure 47 is effective for cooling and the fluid passing through the bearings is effective for lubrication.

The motor rotor assembly comprising the sleeve shaft 49 and the enclosing cover 47 and end plates 48 can be readily mounted in place or removed if desired by removal of the pins 51.

The interior portions of the pump and motor which are exposed to the fluid being pumped are protected against corrosion in a simple but effective manner.

I claim:

1. A motor driven pump comprising a pump housing having an impeller chamber wtih an impeller therein, a motor housing connected to said pump housing and having end members and an outer housing section extending between said members, a cylindrical sleeve extending between said end members and providing therewith and with said outer housing section an isolated motor stator chamber, a motor stator in said stator chamber, the interior of said sleeve providing a motor rotor chamber, spaced bearings fixedly mounted within and in engagement with said sleeve, said bearings having passageways therealong, the passageways of one of said bearings connecting the interior of said sleeve with said impeller chamber and the passageways of another of said bearings connecting the interior of said sleeve with the end of said sleeve opposite said impeller, a shaft rotatably journaled in said bearings and extending into said impeller chamber, said impeller being mounted on said shaft in said impeller chamber, a shaft sleeve on said shaft between said bearings, motor rotor members on said shaft sleeve between said bearings, securing members connecting said shaft sleeve to said shaft and extending diametrically through said shaft, and a cooling fluid connection between said impeller chamber and said opposite end of said sleeve.

2. A motor driven pump as defined in claim 1 in which rotatable thrust members are provided in engagement with said bearings and with which said securing members are in driving engagement.

3. A motor driven pump as defined in claim 1 in which said fluid connection is provided within said shaft.

4. A motor driven pump as defined in claim 1 in which a tongue is provided on said sleeve for endwise engagement with one of said bearings for preventing rotation and endwise displacement of said bearing.

5. In an electric motor driven device having a cylindrical motor stator isolating sleeve, the combination of a shaft longitudinally axially disposed in said cylindrical sleeve, spaced bearing members for said shaft fixedly mounted within and in engagement with said sleeve, said bearing members having inner transversely disposed end facing portions, a shaft sleeve on said shaft between said bearings, motor rotor members on said shaft sleeve between said bearings, securing members connecting said shaft sleeve to said shaft and extending diametrically through said shaft, and rotatable thrust members having outwardly disposed faces for engagement with said facing portions of said bearings.

6. In an electric motor driven device having a cylindrical motor stator isolating sleeve, the combination of a hollow shaft longitudinally axially disposed in said cylindrical sleeve, spaced bearing members for said shaft fixedly mounted within and in engagement with said sleeve, said bearing members having inner transversely disposed end facing portions, a shaft sleeve on said shaft between said bearings, motor rotor members on said shaft between said bearings, securing members connecting said shaft sleeve to said shaft and extending diametrically through said shaft, and rotatable thrust members having outwardly disposed faces for engagement with said facing portions of said bearings, said securing members being in driving engagement with said rotatable thrust members.

7. In an electric motor driven device having a cylindrical motor stator isolating sleeve, the combination of a shaft longitudinally axially disposed in said sleeve, spaced bearing members for said shaft fixedly mounted within and in engagement with said sleeve, said bearing members having inner transversely disposed end facing portions, a shaft sleeve on said shaft between said bearings, motor rotor members on said shaft sleeve between said bearings, said shaft sleeve having end notches therein, securing members engaging in said notches and connecting said shaft sleeve to said shaft and extending diametrically through said shaft, and rotatable thrust members having outwardly disposed faces for engagement with said facing portions of said bearings and inwardly disposed slots, said securing members being in driving engagement in said slots.

8. A motor driven pump comprising a motor housing having spaced end plates, an outer housing member extending between said end plates, a cylindrical sleeve of corrosion resistant material extending between said end plates, spaced fixedly mounted bearing members in engagement with the interior of said sleeve, an end closure contiguous to one of said end plates having an inner face of corrosion resistant material closing one end of said sleeve, a sealing member interposed between said end closure and said one of said end plates, a pump housing enclosing the other end plate and having an impeller chamber with fluid inlet and delivery connections, a motor stator and a motor rotor in said motor housing, a shaft driven by said motor rotor and extending into said impeller chamber, said shaft being journaled in said bearing members and said motor rotor being mounted on said shaft between said bearing members, and an impeller on said shaft in said impeller chamber, the interior of said cylindrical sleeve being in communication with the impeller chamber for the circulation of a portion of the fluid being pumped for cooling the motor stator and motor rotor and lubricating said bearings.

9. A motor driven pump comprising a motor housing having spaced end plates, an outer housing member extending between said end plates, a cylindrical sleeve of corrosion resistant material extending between said end plates, facing members of corrosion resistant material on the outer faces of said end plates and secured to and extending radially outwardly from said sleeve, an end closure contiguous to one of said end plates having an inner face of corrosion resistant material closing one end of said sleeve, a sealing member interposed between said end closure and said one of said end plates, a pump housing enclosing the other end plate and having an impeller chamber with fluid inlet and delivery connections, said impeller chamber being exposed to said facing member of said other end plate, spaced bearing members fixedly mounted within said sleeve in engagement with the interior thereof, a motor stator and a motor rotor in said motor housing, a shaft driven by said motor rotor and extending into said impeller chamber, said shaft being journaled in said bearing members and said motor rotor being secured to said shaft between said bearing members, and an impeller on said shaft in said impeller chamber, the interior of said cylindrical sleeve being in communication with the impeller chamber for the circulation of a portion of the fluid being pumped for cooling the motor stator and motor rotor and lubricating said bearings.

References Cited in the file of this patent

UNITED STATES PATENTS

| | | |
|---|---|---|
| 1,983,260 | Zorzi | Dec. 4, 1934 |
| 2,143,484 | Jacobsen | Jan. 10, 1939 |
| 2,603,161 | Lloyd | July 15, 1952 |
| 2,649,048 | Pezzillo et al. | Aug. 18, 1953 |
| 2,649,049 | Pezzillo et al. | Aug. 18, 1953 |
| 2,651,998 | Bergh | Sept. 15, 1953 |
| 2,669,187 | Guyer | Feb. 16, 1954 |
| 2,800,597 | Dunn | July 23, 1957 |
| 2,814,254 | Litzenberg | Nov. 26, 1957 |

FOREIGN PATENTS

| | | |
|---|---|---|
| 289,479 | Switzerland | July 1, 1953 |